(12) United States Patent
Reddy et al.

(10) Patent No.: US 9,147,002 B2
(45) Date of Patent: Sep. 29, 2015

(54) SYSTEM AND METHOD FOR CONTENT STORAGE AND RETRIEVAL

(75) Inventors: Subodh M. Reddy, San Jose, CA (US); Kanji Uchino, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 388 days.

(21) Appl. No.: 13/562,876

(22) Filed: Jul. 31, 2012

(65) Prior Publication Data
US 2014/0040363 A1 Feb. 6, 2014

(51) Int. Cl.
G06F 15/16 (2006.01)
G06F 17/30 (2006.01)
G09B 5/06 (2006.01)
G09B 7/02 (2006.01)
G09B 19/00 (2006.01)

(52) U.S. Cl.
CPC ............ *G06F 17/30873* (2013.01); *G09B 5/06* (2013.01); *G09B 7/02* (2013.01); *G09B 19/0053* (2013.01)

(58) Field of Classification Search
CPC ................................. G06F 15/16; G06Q 50/01
USPC ................... 709/203, 204, 217, 219; 705/319
See application file for complete search history.

(56) References Cited

U.S. PATENT DOCUMENTS

| 6,988,138 | B1* | 1/2006 | Alcorn et al. ................ 709/225 |
| 2005/0256955 | A1* | 11/2005 | Bodwell et al. .............. 709/224 |
| 2006/0218563 | A1* | 9/2006 | Grinstein et al. ............ 719/328 |
| 2007/0048719 | A1* | 3/2007 | He et al. ....................... 434/350 |
| 2009/0017436 | A1* | 1/2009 | Sumrall et al. ................ 434/433 |
| 2009/0106822 | A1* | 4/2009 | Obasanjo et al. ................ 726/4 |
| 2009/0313224 | A1* | 12/2009 | Fields et al. ...................... 707/3 |
| 2010/0010826 | A1* | 1/2010 | Rosenthal et al. ................ 705/1 |
| 2011/0212430 | A1* | 9/2011 | Smithmier et al. ........... 434/322 |
| 2012/0078885 | A1* | 3/2012 | Araya ........................... 707/722 |
| 2012/0208163 | A1* | 8/2012 | Dwyer et al. ................. 434/322 |
| 2012/0226623 | A1* | 9/2012 | Jurney et al. .................. 705/321 |
| 2013/0031208 | A1* | 1/2013 | Linton et al. .................. 709/217 |
| 2013/0073387 | A1* | 3/2013 | Heath ........................ 705/14.53 |
| 2013/0073568 | A1* | 3/2013 | Federov et al. ............... 707/749 |
| 2013/0073983 | A1* | 3/2013 | Rasmussen et al. .......... 715/753 |
| 2013/0080549 | A1* | 3/2013 | Watanabe et al. ............. 709/206 |
| 2013/0091454 | A1* | 4/2013 | Papa et al. ..................... 715/772 |
| 2014/0214850 | A1* | 7/2014 | Liang et al. ................... 707/740 |

OTHER PUBLICATIONS

Ranganathan, et al., "A multiagent system using associate rule mining (ARM), a Collaborative filtering approach", IEEE, Computer Engineering and Technology (ICCET), 2010 2nd International Conference on (vol. 7), Apr. 16-18, 2010 V7-574-578.*

Dominoni, et al., "Omega Network: An adaptive approach to social learning", IEEE, Intelligent Systems Design and Applications (ISDA), 2010 10th International Conference on Date of Conference, Nov. 29-Dec. 1, 2010, pp. 953-958.*

* cited by examiner

*Primary Examiner* — Brian J Gillis
*Assistant Examiner* — Amy Ling
(74) *Attorney, Agent, or Firm* — Baker Botts L.L.P.

(57) ABSTRACT

A method includes storing content graph information regarding individual items of content accessed by one or more users of a system, storing path graph information comprising the order in which each of the one or more users accessed individual items of content, and selecting individual items of content to be presented to a subsequent user of the system and an order in which such individual items of content are presented to the subsequent user based on the stored content graph information and the stored path graph information.

15 Claims, 9 Drawing Sheets

SYSTEM AND METHOD FOR CONTENT STORAGE AND RETRIEVAL

TECHNICAL FIELD

This disclosure generally relates to content management, and in particular, storing, identifying, retrieving, and exploring content and paths for a particular user in order to assist other users in discovering similar information.

BACKGROUND

Electronic learning or "e-learning" may generally refer to the computer and network-enabled transfer of skills and knowledge. E-learning applications and processes may include Web-based learning, computer-based learning, virtual education opportunities and digital collaboration. Content is delivered via the Internet, intranet/extranet, audio or video tape, satellite TV, and/or CD-ROM. It may be self-paced or instructor-led and includes media in the form of text, image, animation, streaming video and audio. Typically, existing e-learning systems have static content that is difficult to customize for individual users.

SUMMARY

In one embodiment, a system includes one or more processors, a memory, and computer-executable instructions stored on a computer readable medium. The instructions are readable by the one or more processors. The instructions, when read and executed, cause the one or more processors to store content graph information regarding individual items of content accessed by one or more users of the system, store path graph information comprising the order in which each of the one or more users accessed individual items of content, and select individual items of content to be presented to a subsequent user of the system and an order in which such individual items of content are presented to the subsequent user based on the stored content graph information and the stored path graph information.

In another embodiment, a method includes storing content graph information regarding individual items of content accessed by one or more users of a system, storing path graph information comprising the order in which each of the one or more users accessed individual items of content, and selecting individual items of content to be presented to a subsequent user of the system and an order in which such individual items of content are presented to the subsequent user based on the stored content graph information and the stored path graph information.

In yet another embodiment, an article of manufacture includes a computer readable medium and computer-executable instructions stored on the computer readable medium. The instructions are readable by a processor. The instructions, when read and executed, cause the processor to store content graph information regarding individual items of content accessed by one or more users of the system, store path graph information comprising the order in which each of the one or more users accessed individual items of content, and select individual items of content to be presented to a subsequent user of the system and an order in which such individual items of content are presented to the subsequent user based on the stored content graph information and the stored path graph information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

DESCRIPTION OF EXAMPLE EMBODIMENTS

Figure 1:
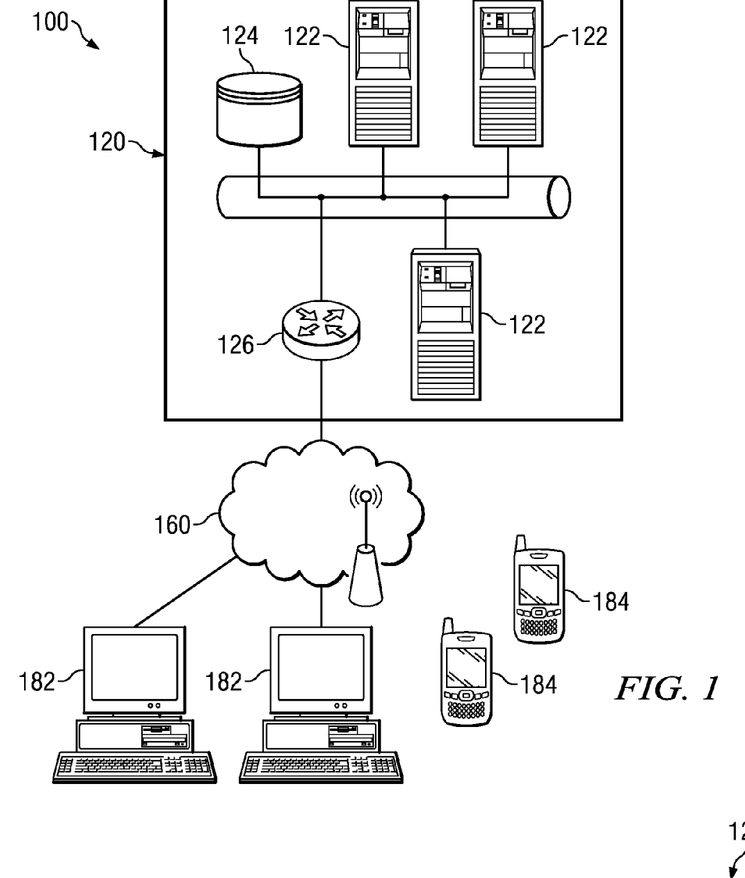
FIG. 1 illustrates an example network environment, in accordance with embodiments of the present disclosure.

FIG. 1 illustrates an example network environment, in accordance with embodiments of the present disclosure. Particular implementations of the invention operate in a wide area network environment, such as the Internet, including multiple network addressable systems. Network cloud 160 generally represents one or more interconnected networks, over which the systems and hosts described herein can communicate. Network cloud 160 may include packet-based wide area networks (such as the Internet), local area networks, private networks, wireless networks, satellite networks, cellular networks, paging networks, and the like.

As FIG. 1 illustrates, a particular implementation of the invention may operate in a network environment comprising network application hosting site 120, such as an informational web site, social network site, educational web site, and the like. Although FIG. 1 illustrates only one network application hosting site, implementations of the invention may operate in network environments that include multiples of one or more of the individual systems and sites disclosed herein. Client nodes 182, 184 may be operably connected to the network environment via a network service provider or any other suitable means.

A client node may include a computer or computing device including functionality for communicating over a computer network. A client node may include a personal computer 182 (e.g., a desktop, laptop, notebook, or tablet computer, etc.) or a mobile devices 184 (e.g., a cellular telephone, a smartphone, a personal digital assistant, etc.). A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein may communicate over the network 160 using any suitable communications protocols. For example, client nodes 182, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as eXtensible Markup Language (XML), and the like.

In some client-server protocols, such as the use of HTML over HTTP, a server generally transmits a response to a request from a client. The response may include one or more data objects. For example, the response may include a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 184 may use other communications protocols and data formats. For example, mobile client nodes 184, in some implementations, may include Wireless Application Protocol (WAP) functionality and a WAP browser. The use of other wireless or mobile device protocol suites is also possible. In addition, the network environment may also include protocol translation gateways, proxies or other systems to allow mobile client nodes 184, for example, to access other network protocol environments. For example, a user may use a mobile client node 184 to capture an image and upload the image over the carrier network to a content site connected to the Internet.

Network application hosting site 120 may be a network addressable system that hosts a network application accessible to one or more users over a computer network. The network application may be an informational web site where users request and receive identified web pages and other content over the computer network. The network application may also be a search platform, an on-line forum or blogging application where users may submit or otherwise configure content for display to other users. The network application may also be a social network application allowing users to configure and maintain personal web pages. The network application may also be a content distribution application, (e.g., a music store/library, a podcasting server), that displays available content, and transmits content to users.

Network application hosting site 120 may include one or more physical servers 122 and data store 124. The one or more physical servers 122 may be operably connected to computer network 160 via a router 126. The one or more physical servers 122 may host functionality that provides a network application (e.g, a news content site, etc.) to a user. As discussed in connection with FIG. 2, the functionality hosted by the one or more physical servers 122 may include web or HTTP servers, ad serving systems, geo-targeting systems, and the like. Still further, some or all of the functionality described herein may be accessible using an HTTP interface or presented as a web service using SOAP or other suitable protocols.

Data store 124 may store application data and/or content. Content may be stored as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Application data may include various user data, metadata, and/or other data used by a network application to carry out the functionality of the network application. Examples of application data may include path graphs, content graphs, social graphs, and/or associated user metadata, and graph metadata as described in greater detail below. Structurally, data store 124 may connote a large class of data storage and management systems. In particular implementations, data store 124 may be implemented by any suitable physical system including components, such as database servers, mass storage media, media library systems, and the like.

Network application hosting site 120, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control.

Figure 2:
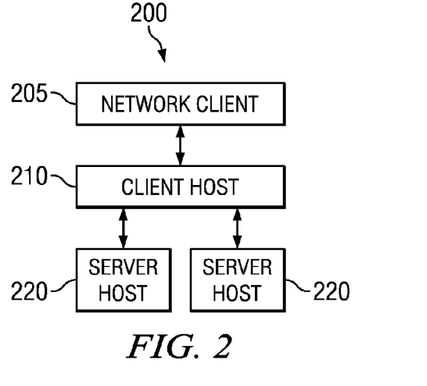
FIG. 2 illustrates a client host server environment, in accordance with embodiments of the present disclosure.

FIG. 2 illustrates a client host server environment 200, in accordance with embodiments of the present disclosure. As FIG. 2 illustrates, network application hosting site 120 may include one or more network clients 205 and one or more client hosts 210 operating in conjunction with one or more server hosts 220. The foregoing functional modules may be realized by hardware, executable modules stored on a computer readable medium, or a combination of both. The functional modules, for example, may be hosted on one or more physical servers 122 and/or one or more client computers 182, 184.

Network client 205 may include a web client hosted on client computers 182, 184, a client host 210 located on physical server 122, or a server host located on physical server 122. Client host 210 may be an executable web or HTTP server module that accepts HyperText Transport Protocol (HTTP) requests from network clients 205 acting as a web clients, such web browser client applications hosted on client computers 182, 184, and serving HTTP responses including contents, such as HyperText Markup Language (HTML) documents and linked objects (images, advertisements, etc.). Client host 210 may also be an executable module that accepts Simple Object Access Protocol (SOAP) requests from one or more client hosts 210 or one or more server hosts 220. In some embodiments, client host 210 may have the capability of delegating all or part of single or multiple requests from network client 205 to one or more server hosts 220. Client host 210, as discussed above, may operate to deliver a network application, such as an informational web page or an Internet search service.

In a particular implementation, client host 210 may act as a server host 220 to another client host 210 and may function to further delegate requests to one or more server hosts 220 and/or one or more client hosts 210. Server hosts 220 host one or more server applications, such as an ad selection server, sponsored search server, content customization server, and the like.

Figure 3:
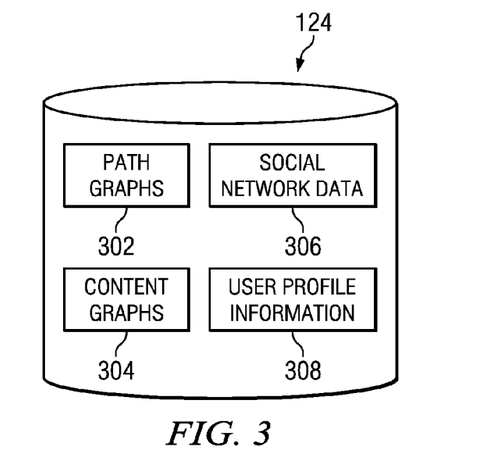
FIG. 3 illustrates a block diagram of a data store and example types of data that may be stored to the data store, in accordance with embodiments of the present disclosure.

FIG. 3 illustrates a block diagram of data store 124 and example types of data that may be stored to data store 124, in accordance with embodiments of the present disclosure. As shown in FIG. 3, data store 124 may store path graphs 302, content graphs 304, social network data 306 (such as social graphs), and user profile information 308. Any of such path graphs 302, content graphs 304, social network data 306, and/or user profile information 308 may be implemented in a database (e.g., structured query language (SQL) database, NoSQL database, graph database) or other suitable data structure.

In using an e-learning application or other application, a user may follow a path. A path may be a particular trail of content (e.g., text, images, graphics, audio, video, or other multimedia) that a user may follow for a particular purpose (e.g., as part of an e-learning curriculum). A path graph 302 may comprise a graph which represents a particular path for one or more particular users of an application, in which vertices of the path graph 302 represent a particular content associated with the users and directed edges of the path graph 302 represent an order of access of the content. In one embodiment, the content represented by a vertex of the path graph 302 may include a task to be completed by a user. An example of a path graph 302 is described in below in connection with FIGS. 4A-4J. A content graph 304 may comprise a graph which represents for all users of the application, in which vertices of the content graph 304 represent individual items of content accessed by the users and directed edges of the content graph 304 represent an order of accessing the content. An example of a content graph 304 is described in below in connection with FIGS. 4A-4J. As described above, a task embodied by vertex of a path graph 302 may correspond with an associated item of content embodied by a vertex of content graph 304. Accordingly, each path graph 302 and/or content graph 304 may include a representation of the relationship between individual tasks and their associated items of content (e.g., by way of dotted lines and arrows depicted in FIGS. 4A-4J).

In some embodiments, users of the application may be members of a social network. In a social networking service, each user of the social network may create a network profile (e.g., username, password, and/or biographical information) via a client node 182, 184. For example, a user may access the social network via an application program available at the client node and/or via a website for the social network. Via client nodes 182, 184, each user may also specify other users in the social network to which the user has a social tie. In this disclosure, the terms "social tie" and "tie" may be used to indicate a social relationship between two users in a social network (e.g., a "peer," "mentor," "friend," "buddy," "connection," "link," etc.), while the term "contact" may be used to indicate a user for which a user has a social tie. In addition to a social tie existing based on a declared relationship between users, a social tie may also be derived by the social networking service on the basis of shared interests and/or biographical information of the users. The social networking application, user biographical information, social ties, and contact information may be hosted at network application hosting site 120 in data store 124 as social network data 306. A social graph such as that depicted in FIGS. 4A-4J may represent various social ties in a social network. For example, vertices of a social graph may represent users of the social network while edges of the graph depict the existence of social ties between users in the social network.

User profile information 308 may comprise biographical information relating to users of the application, including name, position, title, education, proficiency, etc.

Figure 4A:
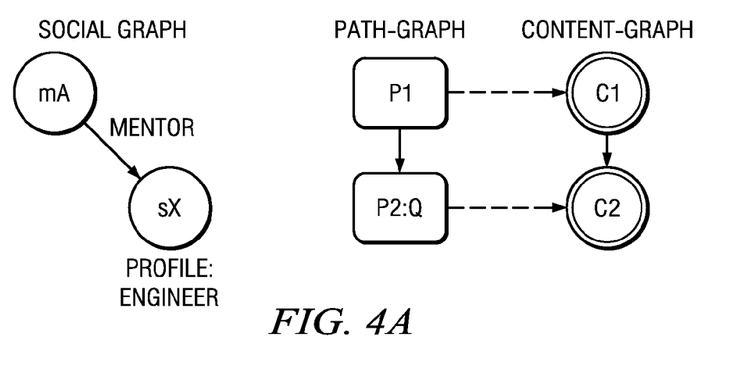
FIGS. 4A-4J illustrate an example of storing a content graph and path selection based on the content graph and associated social graphs and path graphs, in accordance with embodiments of the present disclosure.

FIGS. 4A-4J depicts an illustrative example of storing a content graph and path selection based on the content graph and its associated data, in accordance with embodiments of the present disclosure. In the illustrative example, a social graph depicted in FIG. 4A may indicate that a user mA is a mentor of a user sX, whose biographical information (e.g., stored as user profile information 308) may indicate that such user is an engineer. User mA may create a learning curriculum for sX having content C1 and C2, which may include tasks to be completed. In response, as shown in FIG. 4A, the network application may create a path graph having vertices P1 and P2:Q representing content C1 and C2, with a directed edge from P1 to P2: Q and a content graph having vertices C1 and C2 with a directed edge from C1 to C2, along with indications of the relationships between the elements of the path graph and the content of the content graph (e.g., as indicated by dashed arrows in FIG. 4A). For example, P1 may represent a lesson for a particular subject while P2 represent a quiz or examination (as indicated by the "Q" in the vertex P2) to determine whether user sX is proficient in the subject matter learned in the content represented by P1. As an illustrative example, content C1 associated with P1 could be a text, video, and/or audio including a lesson for sX, while content C2 associated with P2 could be an interactive online examination. Each vertex in the path graph may include data or metadata associated with tasks associated with the represented content, including a title for the task (e.g., P1, P2:Q) and one or more users for whom the task is applicable. In addition, each vertex in the content graph may include data or metadata associated with the content, including a unique identifier for the content (e.g., uniform resource locator, file path name, a hash of the content, user creating the content, user creating adding the vertex to the content graph, etc.), and one or more users for whom the content is applicable.

Figure 4B:
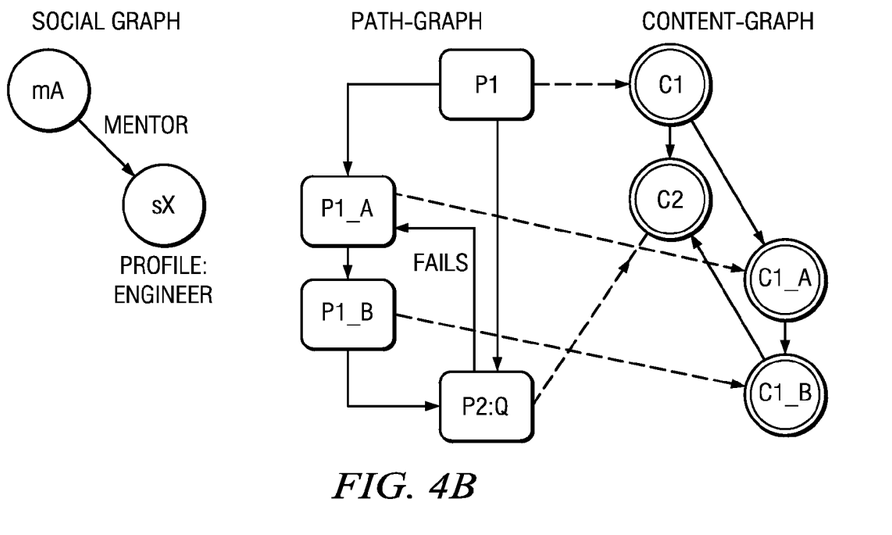

Consider that user sX fails the examination at P2:Q of the path graph. In response, user mA may create a new path in order that user sX receives remedial instruction, such path including addition lessons represented by vertices P1_A and P1_B and associated with content C1_A and C1_B, respectively. As shown in FIG. 4B, the network application may add vertices P1$^{13}$1 A and P1_B to the path graph, with directed edges from P1 to P1_A, from P¯A to P1_B, from P1_B to P2:Q, and P2:Q to P1_A, indicating potential user paths through the path graph. In addition, the network application may add vertices C1_A and C1_B to the content graph, with directed edges from C1 to C1_A, from C1_A to C1_B, and from C1_B to C2, indicating potential user paths through the content represented by the content graph. Furthermore, one or both of the path graph and the content graph may include an indication of the association between P1_A and C1_A and between P1_B and C1_B.

Figure 4C:
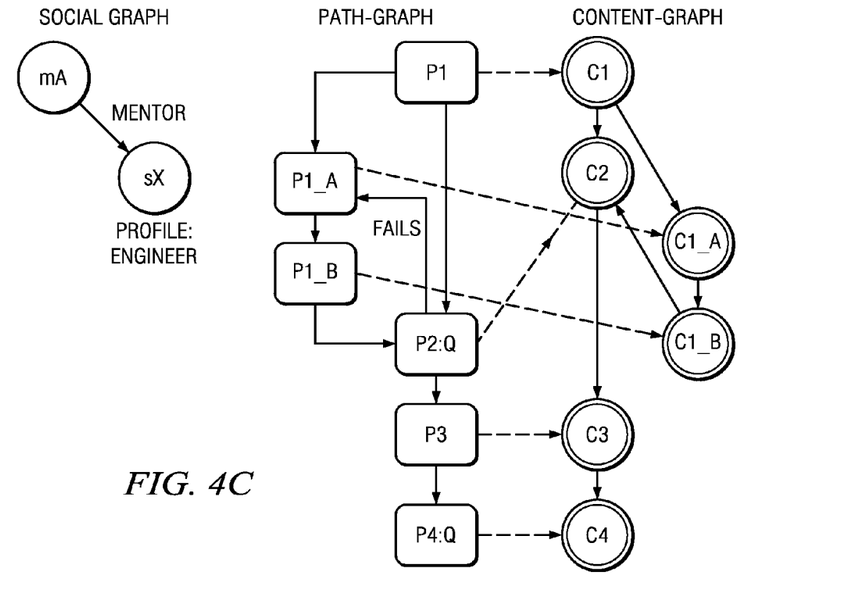

As mA continues to mentor sX, mA may create additional vertices P3 and P4 associated with content C3 and C4, respectively. For example, vertex P3 may represent a lesson for a particular subject while P4 may represent a quiz or examination (as indicated by the "Q" in the vertex P4) to determine whether user sX is proficient in the subject matter learned in vertex P2. In response, as shown in FIG. 4C, the network application may add vertices P3 and P4 to the path graph, with directed edges from P2:Q to P3, and from P3 to P4, indicating potential user paths through the path graph. In addition, the network application may add vertices C3 and C4 to the content graph, with directed edges from C2 to C3 and from C3 to C4, indicating potential user paths through the content represented by the content graph. Furthermore, one or both of the path graph and the content graph may include an indication of the association between P3 and C3 and between P4 and C4.

Figure 4D:
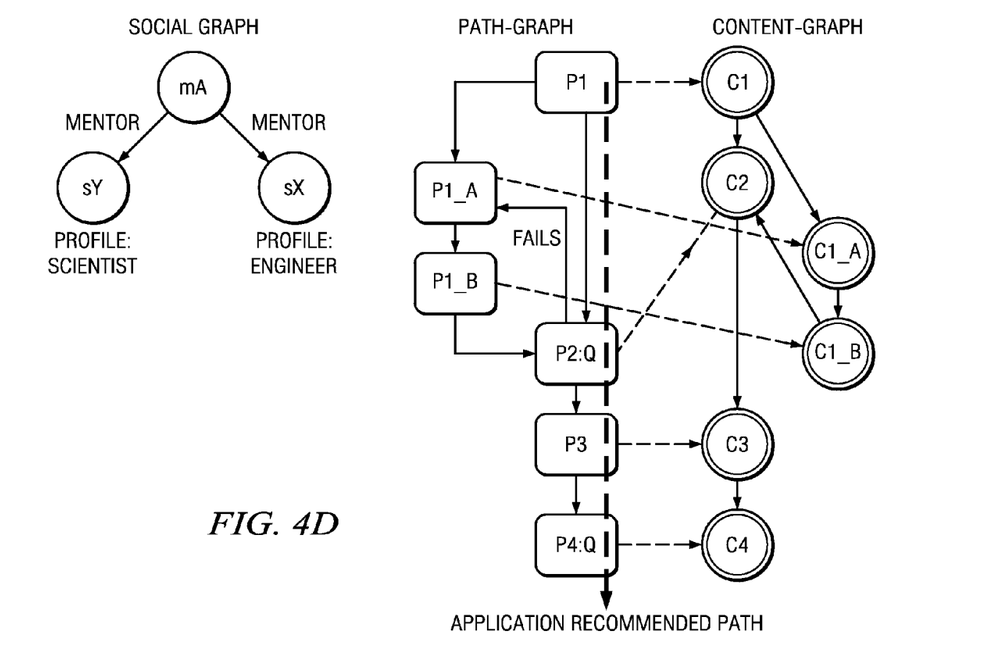

At a later time, user mA may also mentor user sY having biographical information indicating sY is a "scientist," as indicated by the social graph depicted in FIG. 4D. As shown by the arrow traversing the path P1-P2:Q-P3-P4:Q, the network application may recommend a path for user sY, based on the existing path graph, content graph, social graph, user profile information, and/or other factors. As shown in FIG. 4D, sX and sY are not connected by a social tie and do not have similar biographical information, and thus, the network application may not recommend that sY traverse the same path as sX and may select a path based on other factors, such as the fact that the path P1-P2:Q-P3-P4:Q is the shortest possible path.

Figure 4E:
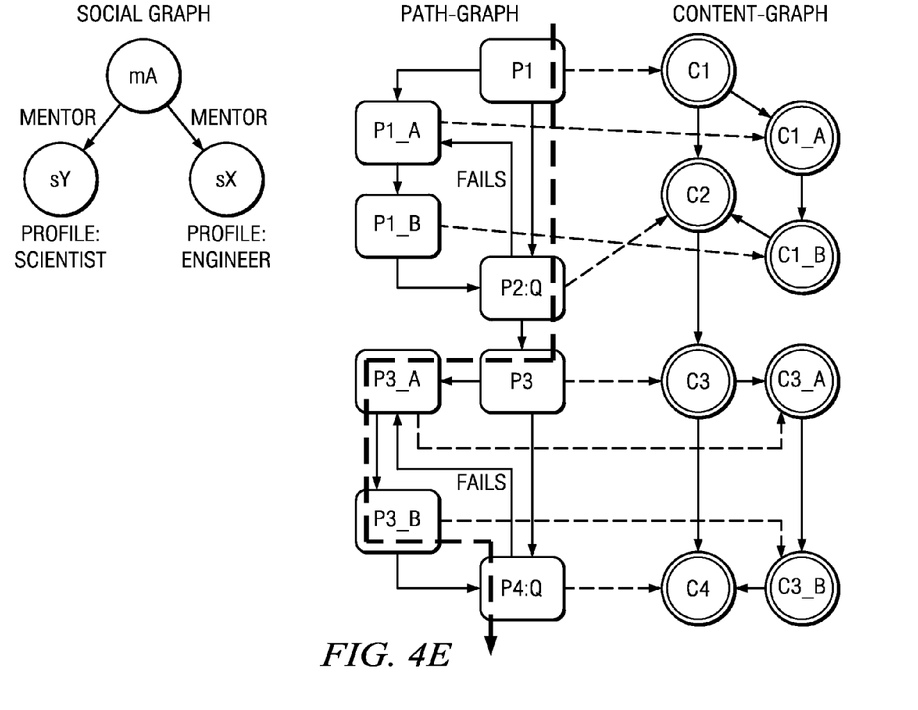

Consider that user sY fails the examination at P4:Q of the path graph. In response, user mA may create a new path in order that user sY receives remedial instruction, such path including addition lessons represented by vertices P3_A and P3_B and associated with content C3_A and C3_B, respectively. As shown in FIG. 4E, the network application may add vertices P3_A and P3_B to the path graph, with directed edges from P3 to P3_A, from P3_A to P3_B, from P3_B to P4:Q, and P4:Q to P3_A, indicating potential user paths through the path graph. In addition, the network application may add vertices C3_A and C3_B to the content graph, with directed edges from C3 to C3_A, from C3_A to C3_B, and from C3_B to C4, indicating potential user paths through the content represented by the content graph. Furthermore, one or both of the path graph and the content graph may include an indication of the association between P3_A and C3_A and between P3_B and C3_B.

Figure 4F:
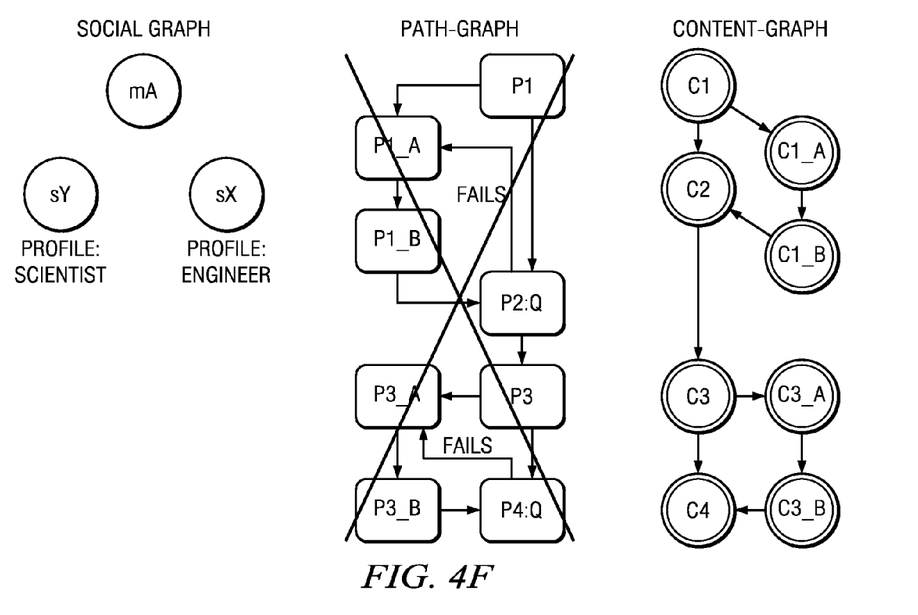

At a later time, user mA may cease being a mentor and the path graph may be deleted, as shown in the social graph of FIG. 4F. However, the stored content graph, social network data, and/or user profile information may be used to retrieve paths from the content graph, as described in greater detail below.

Figure 4G:
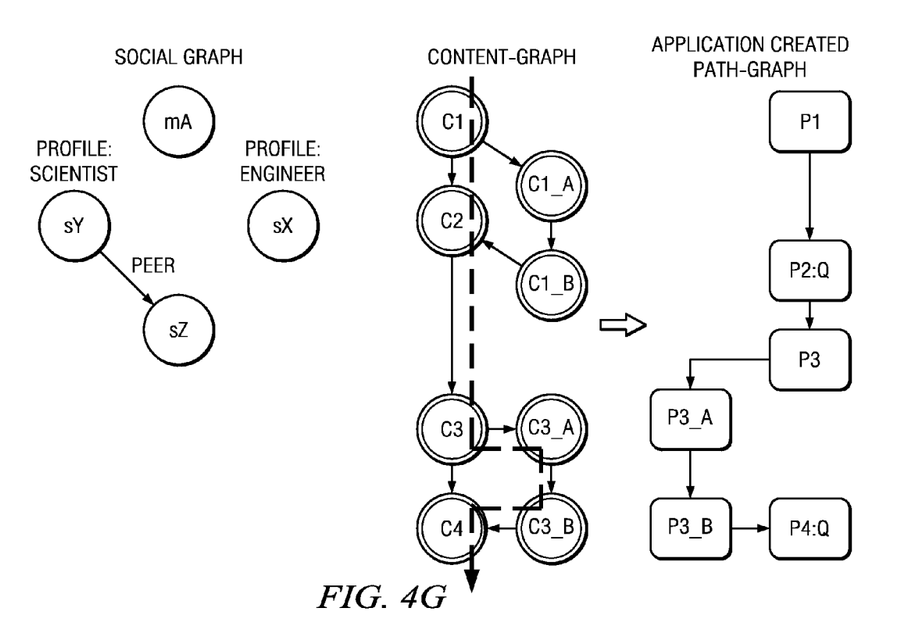

Consider that a user sZ joins the social network as a "peer" of sY as indicated in the social graph of FIG. 4G. As shown by the dashed arrow traversing the path C1-C2-C3-C3_A-C3_B-C4, the network application may recommend a path for user sZ, based on the existing content graph, social graph, user profile information, and/or other factors. In particular, the network application may select this path for sZ based on the fact that sY and sZ have a social tie, and the selected path is that which sY traversed.

Figure 4H:
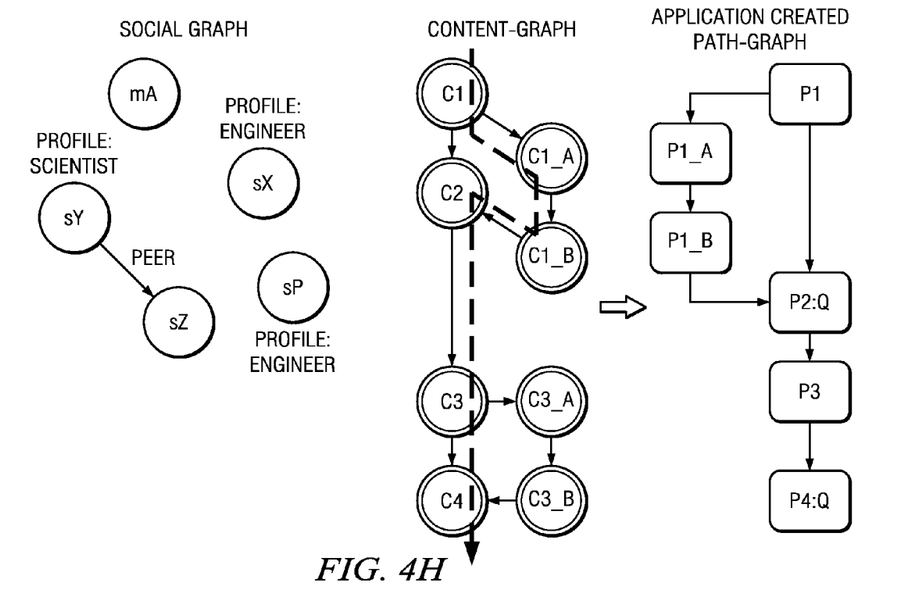

Consider that a user sP joins the social network with biographical information indicating that user sP is an "engineer" but does not have a social tie with any other existing user as indicated in the social graph of FIG. 4H. As shown by the dashed arrow traversing the path C1-C1_A-C1_B-C2-C3-C4, the network application may recommend a path for user sP, based on the existing content graph, social graph, user profile information, and/or other factors. In particular, the network application may select this path for sP based on the fact that sP and sX have similar biographical information (e.g., both are engineers), and the selected path is that which sX traversed.

Figure 4I:
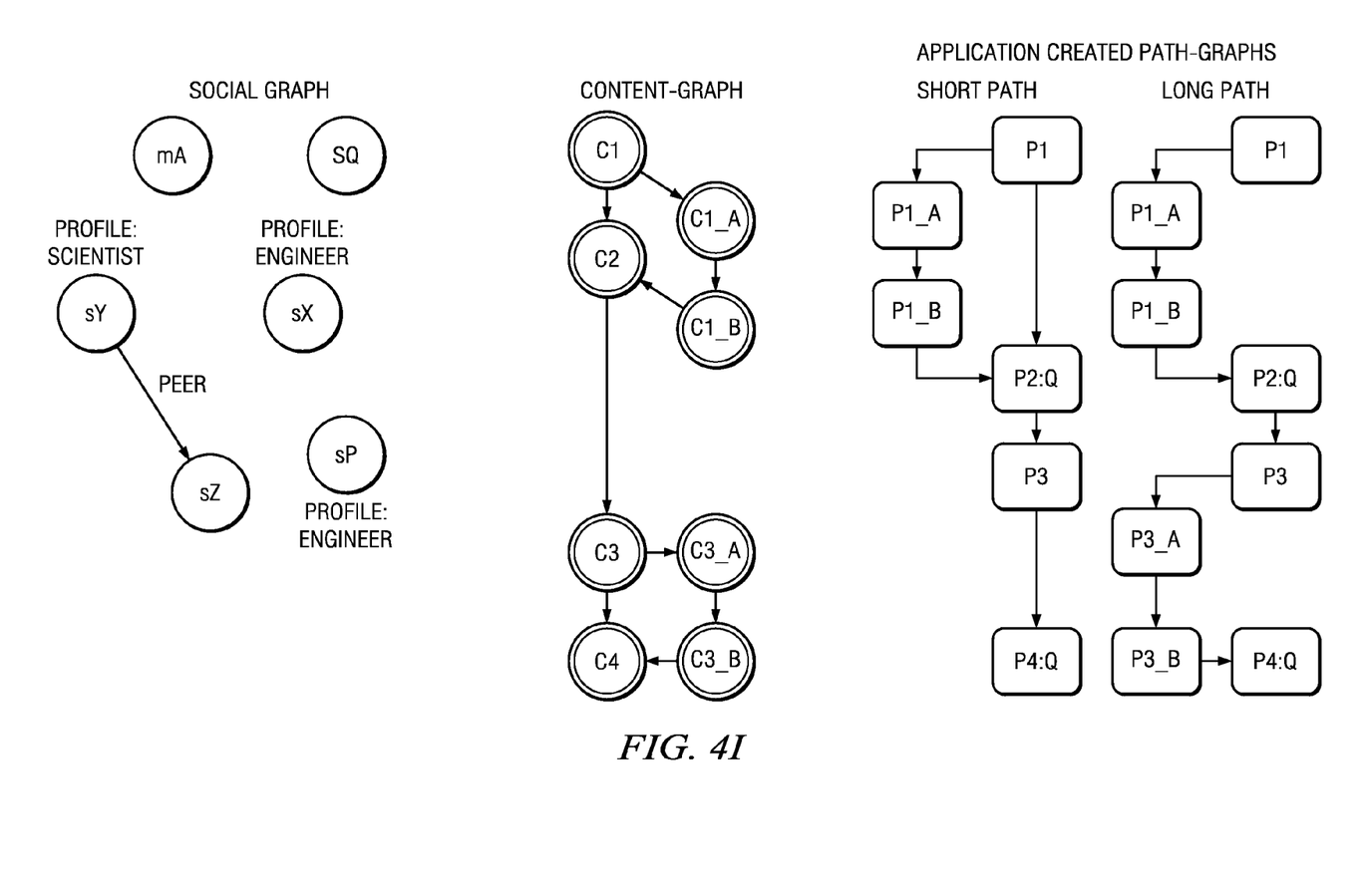

Consider that a user sQ joins the social network without a social tie to an existing user or biographical information matching another user, as shown in the social graph of FIG. 4I. In such case, the network application may select a path (e.g., one of either the "short path" or "long path" shown in FIG. 4I) based on a level of proficiency of the user, based on the user's previous performances associated with other use of the network application and/or based on profile information.

Figure 4J:
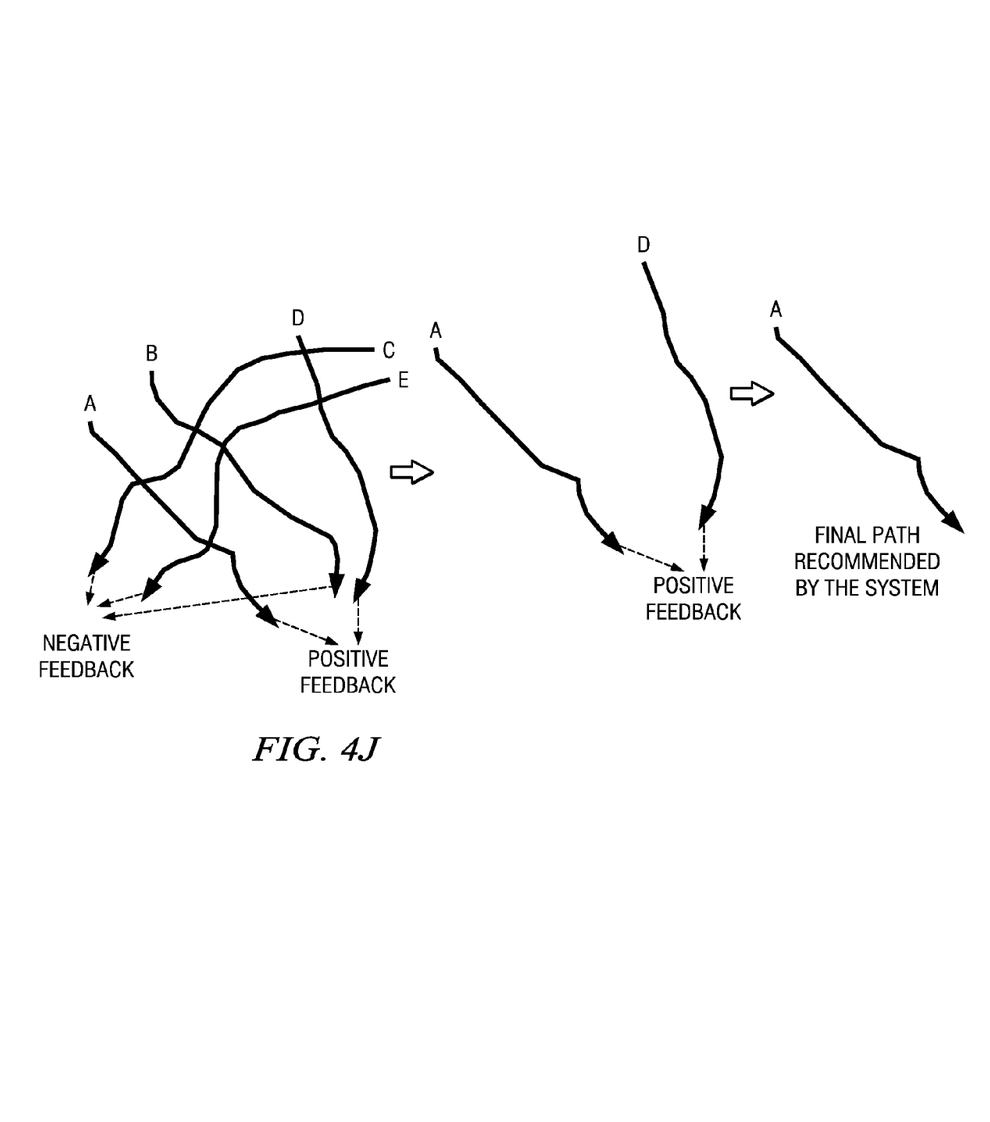

Consider that a user sR joins the social network without a social tie to an existing user or biographical information matching another user, as shown in the social graph of FIG. 4J. Also consider that a number of potential paths A, B, C, D, and E in a content graph are available for traversal by user sR. In such case, the network application may select a path based on feedback (e.g., comments, reviews, ratings) made by other users regarding such paths or content associated therewith. In some embodiments, such feedback information may be stored as part as social network data 306. For example, paths B, C, and E may include negative comments from other users, and thus, may be eliminated by the network application as potential selected paths for sR, leaving paths A and D as potential paths, as depicted in FIG. 4J. Consider that sR has indicated liking prior content associated with content present in path A (e.g., content created by the same user) but not for content present in path D. Based on such information (which, in some embodiments, may be stored as part as social network data 306) the network application may select path A over path D, as shown in FIG. 4J.

Thus, as shown above, information regarding user content paths may be stored, and such information, along with social network information and user biographical information, may be used to select a path for another user. In embodiments of the present disclosure, a content path for a user may be selected on a vertex-by-vertex basis, based on one or more rules. For example, an initial content graph vertex for a user may be selected by the user based on keyword search or goal, or suggested by social tie or mentor. Following that, given each vertex of the user's path, the following set of rules may be applied to select the subsequent vertex for the user:

1. Consider content vertices connected to the current vertex in the content graph.

2. Consider content vertices in the paths of social network ties of the user that match a keyword search and/or goal of the user, and/or are for social network ties having matching or similar biographical information.

3. Consider content vertices in the paths of users who are not social network ties of the user that match a goal of the user and/or are users having matching or similar biographical information.

4. Employ a structured or semi-structured classification to collect all vertices that have some sort of similarity matching (based on the properties, words, or semantic meanings used for classification) to nodes found using rules 1, 2, and 3. If A represents the collection of nodes found using rules 1, 2, and 3, using structured or semi-structured classification one can find a new set of nodes called B that is some way matched to that of A. After using rule 4, the new set of nodes will be A union B.

5. Sort the vertices collected in rule 4 based on the following priority, and select a vertex based on such priority:
   A. Intersection of vertices satisfying rules 1 and 2, considering vertices having a positive feedback history.
   B. Intersection of vertices satisfying rules 1 and 2, considering vertices having a positive feedback history.
   C. Remaining vertices satisfying rule 1.
   D. Remaining vertices satisfying rules 2 and 3.
   E. Vertices satisfying rule 4.

Figure 5:
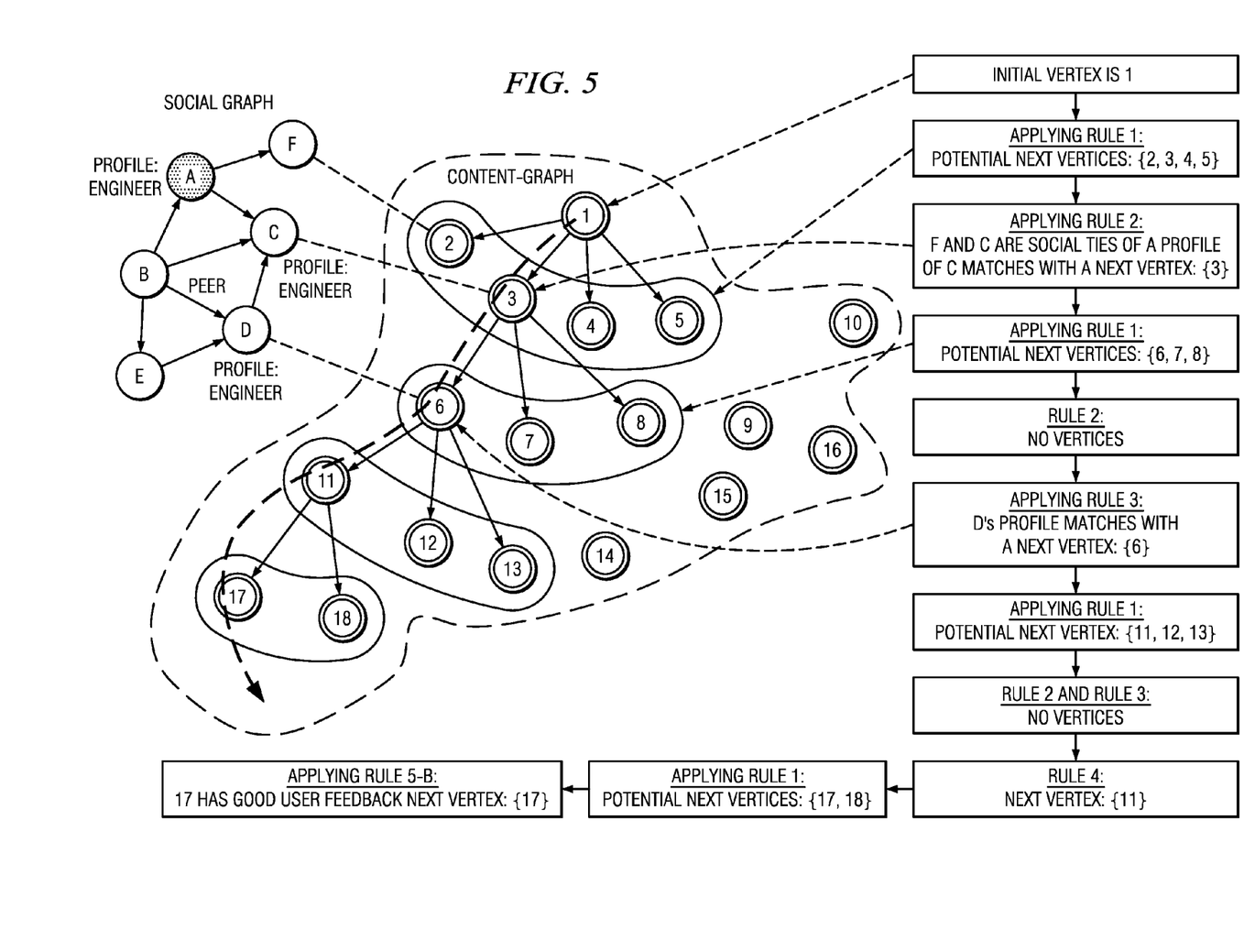
FIG. 5 illustrates example application of a rules-based approach for selecting a content path for a user based on a social graph, in accordance with embodiments of the present disclosure.

FIG. 5 illustrates example application of the rules-based approach described above for an example content graph and an example social graph, in accordance with embodiments of the present disclosure. The illustrative example of FIG. 5 details selection of a path for user labeled A in the social graph of FIG. 5. Initially, vertex 1 may be selected as an initial vertex for A based on a keyword search, recommendation by a social tie of user A, or any other suitable manner. Applying rule number 1 above, vertices 2, 3, 4, and 5 may be identified as the potential next vertex based on the fact that that all vertices 2, 3, 4, and 5 have a directed edge from vertex 1. From these vertices, rule 2 may be applied to select vertex 3 on the basis that user C is a social tie with user A and has similar biographical information (e.g., both A and C are identified as engineers).

To select the next vertex for user A, rule 1 may be applied to determine that vertices 6, 7, and 8 are the potential next vertices. From these vertices, rule 2 may provide no result, and rule 3 may be applied to select vertex 6 on the basis that users A and D have similar biographical information (e.g., both A and D are engineers).

To select the next vertex for user A, rule 1 may be applied to determine that vertices 11, 12, and 13 are the potential next vertices. From these vertices, rules 2 and 3 may provide no result, and rule 4 may be applied to select vertex 11 on the basis that vertex 11 matched properties, words, or semantic meanings of previous matches from rules 1-3 and on the basis that rules 2 and 3 provide no present results. To select the next vertex for user A, rule 1 may be applied to determine that nodes 17 and 18 are the potential next vertices. From these vertices, rules 2, 3, and 4 may provide no result, and rule 5-B may be applied to select vertex 11 on the basis that node 17 has received positive user feedback. Accordingly, employing a content graph, social networking information, and biographical information of users, the rules-based approach described above generates a path 1-3-6-11-17 for user A, and the network application may present content associated with vertices 1, 3, 6, 11, and 17 to user A to accomplish a particular goal.

Figure 6:
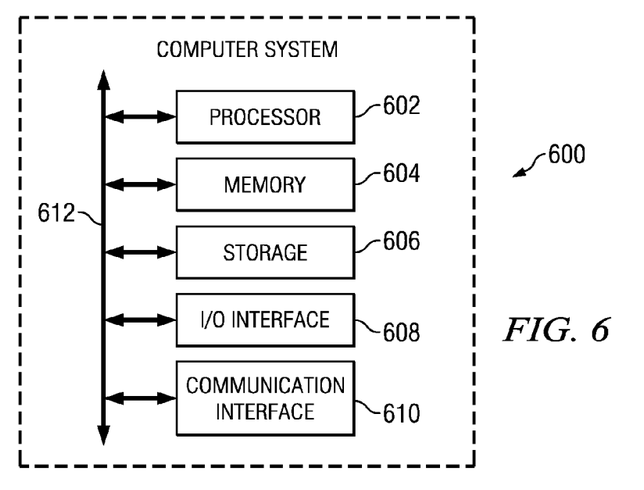
FIG. 6 illustrates an example computer system, in accordance with embodiments of the present disclosure.

Particular embodiments of the present disclosure may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Figure 7:
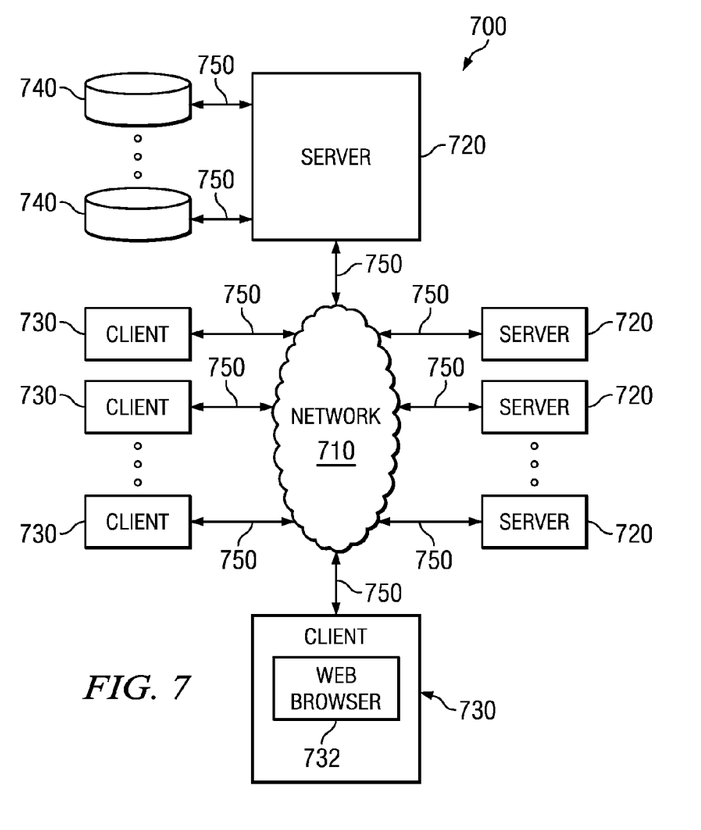
FIG. 7 illustrates an example network environment, in accordance with embodiments of the present disclosure.

Particular embodiments may be implemented in a network environment. FIG. 7 illustrates an example network environment 700. Network environment 700 includes a network 710 coupling one or more servers 720 and one or more clients 730 to each other. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. This disclosure contemplates any suitable network 710.

One or more links 750 couple a server 720 or a client 730 to network 710. In particular embodiments, one or more links 750 each includes one or more wireline, wireless, or optical links 750. In particular embodiments, one or more links 750 each includes an intranet, an extranet, a VPN, a LAN, a WLAN, a WAN, a MAN, a portion of the Internet, or another link 750 or a combination of two or more such links 750. This disclosure contemplates any suitable links 750 coupling servers 720 and clients 730 to network 710. In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores.

In particular embodiments, one or more data storages 740 may be communicatively linked to one or more severs 720 via one or more links 750. In particular embodiments, data storages 740 may be used to store various types of information. In particular embodiments, the information stored in data storages 740 may be organized according to specific data structures. In particular embodiments, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functionalities implemented or supported by client 730. For example and without limitation, a client 730 may be a desktop computer system, a notebook computer system, a netbook computer system, a handheld electronic device, or a mobile telephone. This disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could me made hereto without departing from the spirit and scope of the invention.

What is claimed is:

1. A system comprising:
    one or more processors;
    a memory; and
    computer-executable instructions stored on a computer readable medium, the instructions readable by the one or more processors, the instructions, when read and executed, causing the one or more processors to:
    store content graph information regarding individual items of electronic learning curriculum content accessible by one or more users of the system;
    store path graph information comprising the order in which each of the one or more users accessed individual items of electronic learning curriculum content, wherein the stored path graph information is different from the stored content graph information; and
    select individual items of electronic learning curriculum content to be presented to a subsequent user of the system and an order in which such individual items of content are presented to the subsequent user based on the stored content graph information and the stored path graph information, wherein:
        a relationship between the one or more users of the system and the subsequent user is defined in a social graph; and
        the selection of the individual items is further based upon the relationship defined in the social graph.

2. The system of claim 1, the computer-executable instructions further causing the one or more processors to:
    store social network information regarding the one or more users and the subsequent user; and
    select individual items of content to be presented to a subsequent user of the system and an order in which such individual items of content are presented to the subsequent user based on the stored content graph information, the stored path graph information, and the social network information regarding the one or more users and the subsequent user by applying the social network information to the stored content graph information and stored path graph information.

3. The system of claim 1, the computer-executable instructions further causing the one or more processors to:
    store biographical information regarding the one or more users and the subsequent user; and
    select individual items of content to be presented to a subsequent user of the system and an order in which such individual items of content are presented to the subsequent user based on the stored content graph information, the stored path graph information, and the biographical information regarding the one or more users and the subsequent user.

4. The system of claim 1, the computer-executable instructions further causing the one or more processors to:
    store feedback from the one or more users that accessed the one or more items of individual content; and
    select individual items of content to be presented to a subsequent user of the system and an order in which such individual items of content are presented to the subsequent user based on the stored content graph information, the stored path graph information, and the feedback.

5. The system of claim 1, the computer-executable instructions further causing the one or more processors to:
    store information regarding one or more goals of the one or more users related to the one or more items of individual content; and
    select individual items of content to be presented to a subsequent user of the system and an order in which such individual items of content are presented to the subsequent user based on the stored content graph information, the stored path graph information, and the information regarding the one or more goals.

6. A method comprising:
    storing content graph information regarding individual items of electronic learning curriculum content accessible by one or more users of a system;
    storing path graph information comprising the order in which each of the one or more users accessed individual items of electronic learning curriculum content, wherein the stored path graph information is different from the stored content graph information; and
    selecting individual items of electronic learning curriculum content to be presented to a subsequent user of the system and an order in which such individual items of content are presented to the subsequent user based on the stored content graph information and the stored path graph information, wherein:
        a relationship between the one or more users of the system and the subsequent user defined in a social graph; and
        the selection of the individual items is further based upon the relationship defined in the social graph.

7. The method of claim 6, further comprising:
    storing social network information regarding the one or more users and the subsequent user; and selecting individual items of content to be presented to a subsequent user of the system and an order in which such individual items of content are presented to the subsequent user based on the stored content graph information, the stored path graph information, and the social network information regarding the one or more users and the subsequent user by applying the social network information to the stored content graph information and stored path graph information.

8. The method of claim 6, further comprising:
storing biographical information regarding the one or more users and the subsequent user; and
selecting individual items of content to be presented to a subsequent user of the system and an order in which such individual items of content are presented to the subsequent user based on the stored content graph information, the stored path graph information, and the biographical information regarding the one or more users and the subsequent user.

9. The method of claim 6, further comprising
storing feedback from the one or more users that accessed the one or more items of individual content; and
selecting individual items of content to be presented to a subsequent user of the system and an order in which such individual items of content are presented to the subsequent user based on the stored content graph information, the stored path graph information, and the feedback.

10. The method of claim 6, further comprising:
storing information regarding one or more goals of the one or more users related to the one or more items of individual content; and
selecting individual items of content to be presented to a subsequent user of the system and an order in which such individual items of content are presented to the subsequent user based on the stored content graph information, the stored path graph information, and the information regarding the one or more goals.

11. An article of manufacture comprising:
a non-transitory computer readable medium; and
computer-executable instructions stored on the non-transitory computer readable medium, the instructions readable by a processor, the instructions, when read and executed, causing the processor to:
store content graph information regarding individual items of electronic learning curriculum content accessible by one or more users of the system;
store path graph information comprising the order in which each of the one or more users accessed individual items of electronic learning curriculum content, wherein the stored path graph information is different from the stored content graph information; and
select individual items of electronic learning curriculum content to be presented to a subsequent user of the system and an order in which such individual items of content are presented to the subsequent user based on the stored content graph information and the stored path graph information, wherein:
a relationship between the one or more users of the system and the subsequent user defined in a social graph; and
the selection of the individual items is further based upon the relationship defined in the social graph.

12. The article of claim 11, the computer-executable instructions further causing the one or more processors to:
store social network information regarding the one or more users and the subsequent user; and
select individual items of content to be presented to a subsequent user of the system and an order in which such individual items of content are presented to the subsequent user based on the stored content graph information, the stored path graph information, and the social network information regarding the one or more users and the subsequent user by applying the social network information to the stored content graph information and stored path graph information.

13. The article of claim 11, the computer-executable instructions further causing the one or more processors to:
store biographical information regarding the one or more users and the subsequent user; and
select individual items of content to be presented to a subsequent user of the system and an order in which such individual items of content are presented to the subsequent user based on the stored content graph information, the stored path graph information, and the biographical information regarding the one or more users and the subsequent user.

14. The article of claim 11, the computer-executable instructions further causing the one or more processors to:
store feedback from the one or more users that accessed the one or more items of individual content; and
select individual items of content to be presented to a subsequent user of the system and an order in which such individual items of content are presented to the subsequent user based on the stored content graph information, the stored path graph information, and the feedback.

15. The article of claim 11, the computer-executable instructions further causing the one or more processors to:
store information regarding one or more goals of the one or more users related to the one or more items of individual content; and
select individual items of content to be presented to a subsequent user of the system and an order in which such individual items of content are presented to the subsequent user based on the stored content graph information, the stored path graph information, and the information regarding the one or more goals.

* * * * *